United States Patent [19]

Steinman

[11] 4,308,750

[45] Jan. 5, 1982

[54] METHOD AND APPARATUS FOR DETERMINING DIAMETER AND WALL THICKNESS OF MINUTE HOLLOW SPHERICAL SHELLS

[75] Inventor: David A. Steinman, Ann Arbor, Mich.

[73] Assignee: The United States of America as represented by the United States Department of Energy, Washington, D.C.

[21] Appl. No.: 154,638

[22] Filed: May 30, 1980

[51] Int. Cl.$^3$ .................. G01N 15/02; G01N 21/85
[52] U.S. Cl. ...................... 73/432 PS; 73/57; 250/578
[58] Field of Search ............. 73/432 PS, 57; 356/335; 250/578

[56] References Cited

U.S. PATENT DOCUMENTS 2,949,027 8/1960 Eolkin .
3,763,428 10/1973 Preist ..................... 73/432 PS X
4,196,353 4/1980 Singleton ..................... 250/456

FOREIGN PATENT DOCUMENTS 624145 9/1978 U.S.S.R. ..................... 73/57

OTHER PUBLICATIONS

Francis; A. W., *Wall Effect in Falling Ball Method for Viscosity*, Physics, vol. 4, pp. 403–406, Nov. 1933.

*Primary Examiner*—Charles A. Ruehl
*Assistant Examiner*—Joseph W. Roskos
*Attorney, Agent, or Firm*—John A. Koch; Richard G. Besha; James E. Denny

[57] ABSTRACT

Method and apparatus for determining diameter and wall thickness of hollow microspheres or shells wherein terminal velocities of shells traveling in fluid-filled conduits of differing diameters are measured. A wall-effect factor is determined as a ratio of the terminal velocities, and shell outside diameter may then be ascertained as a predetermined empirical function of wall-effect factor. For shells of known outside diameter, wall thickness may then be ascertained as a predetermined empirical function of terminal velocity in either conduit.

12 Claims, 5 Drawing Figures

METHOD AND APPARATUS FOR DETERMINING DIAMETER AND WALL THICKNESS OF MINUTE HOLLOW SPHERICAL SHELLS

BACKGROUND OF THE INVENTION

The present invention relates to measuring and testing, and more particularly to methods and apparatus for determining dimensional characteristics of minute hollow spherical shells.

In a number of industrial and research applications for minute hollow spherical shells or microspheres, uniformity of shell dimensional characteristics, specifically outside diameter and wall thickness, are important considerations. Laser interferometric, microradiographic and microscopic techniques heretofore proposed for measurement of diameter and wall thickness are cumbersome and time consuming, require trained personnel, and are generally unsatisfactory for use on a mass production basis.

Accordingly, an object of the present invention is to provide a method and apparatus for rapid accurate characterization of hollow microshells by untrained personnel. A further object of the invention is to provide a method and apparatus of the type described which requires minimum handling of the microspheres and is readily adaptable for automated operation.

SUMMARY OF THE INVENTION

It has heretofore been recognized as a principle of fluid dynamics that the terminal velocity of a particle traveling through a fluid is affected by proximity of an adjacent wall surface. In accordance with the present invention, advantage is taken of this "wall effect" principle to measure the outside diameter of hollow microspheres, and then, given shell diameter, to measure wall thickness.

More specifically, and in accordance with the method of the invention, hollow microshells are directed through first and second fluid paths of differing diameter and in each of which the shell is permitted to reach terminal velocity. Terminal velocity is measured in each path. Shell diameter may then be determined as a predetermined empirical function of the ratio of the terminal velocities which, in turn, is a function of the differing "wall effects" in the respective paths. With the shells thus classified by outside diameter, wall thickness may then be determined as a predetermined empirical function of terminal velocity in either path.

Apparatus for practicing the foregoing method in accordance with the invention preferably comprises vertically aligned glass tubes for providing a continuous flow path for the shells. The respective tubes are of differing substantially constant diameters. The tubes are filled with a fluid such as water in which the shells are buoyant so that, upon placement of the individual shells in the lower portion of the aligned tubes, the shells travel upwardly through each tube at corresponding terminal velocities. Optical detectors are coupled to a suitable timing unit for measuring terminal velocities.

BRIEF DESCRIPTION OF THE DRAWINGS

The invention, together with additional objects, features and advantages thereof, will be best understood from the following description, the appended claims and the accompanying drawings in which:

FIG. 4 is a view similar to that of FIG. 1 of alternative apparatus for practicing the invention.

DETAILED DESCRIPTION OF THE DRAWINGS

Figure 1:
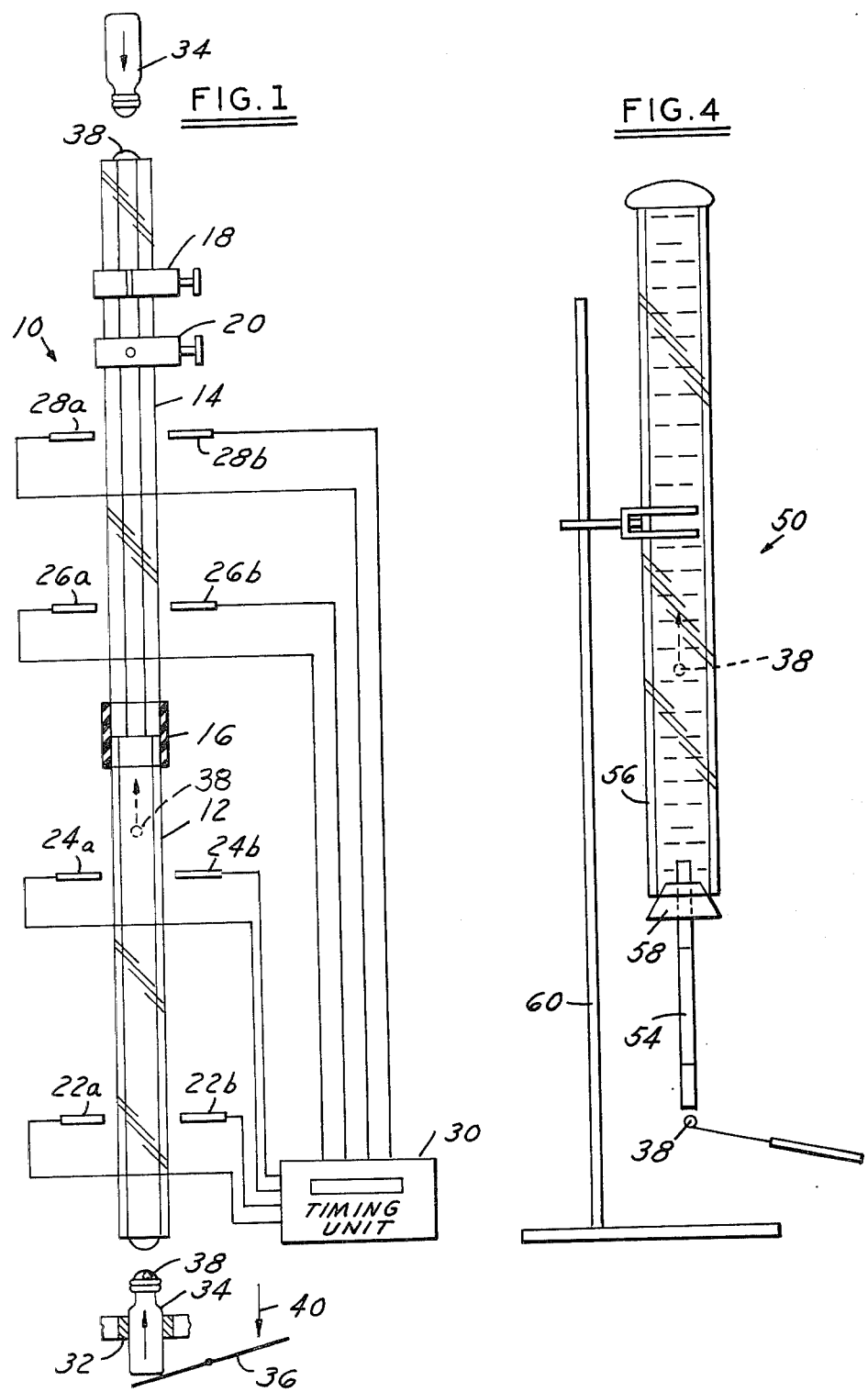
FIG. 1 is a partially schematic elevational view of a presently preferred embodiment of apparatus for practicing the invention.

A presently preferred embodiment 10 of apparatus in accordance with the invention is illustrated semischematically in FIG. 1 (not to scale) as comprising a pair of open-ended tubes or conduits 12,14 carried by means not shown with their axes in vertical alignment. Tubes 12,14 are preferably constructed of translucent material such as glass. Tubes 12,14 possess respectively differing substantially constant inside diameters, tube 12 having the greater inside diameter being disposed beneath tube 14 and having an upper end joined to the lower end of tube 14 in sealed fluid communication as by the gland 16. A pair of vertically spaced manually operated stopcocks 18,20 are carried adjacent an upper end of tube 14.

Optical detectors 22,24,26 and 28 are vertically spaced in respective pairs along tubes 12,14. Each detector is coupled to a timing unit 30 and comprises a light source designated by the suffix "a" and a photocell designated by the suffix "b". A guide sleeve 32 is disposed beneath the lower end of tube 12 and is adapted to receive a specimen bottle 34 such that the bottle rests on the normally lowered pivotal lever 36. Tubes 12,14 and bottle 34 are filled with a fluid in which the shells to be tested are buoyant. For testing glass or plastic microspheres, distilled water at 22° C. is preferred. The tubes and bottle are filled with at least one of the stopcocks 18,20 normally closed such that menisci extend from all open ends as shown.

In operation, a shell is placed in bottle 34 and the bottle is then located within guide 32. Since the shell is buoyant, it rises to the top of the bottle meniscus as shown at 38. Lever 36 is then depressed in the direction 40, raising bottle 34 until the bottle meniscus joins the meniscus extending downwardly from the lower end of tube 12, such that shell 38 enters the tube. As the shell rises, optical coupler 22 is tripped to begin measurement of terminal velocity in tube 12, which measurement is terminated by passage of the shell adjacent coupler 24. Due to the "wall effect" previously discussed, shell 38 rises centrally of tube 12 and passes into a lower end of tube 14. Couplers 26,28 are then successively tripped by passage of the shell so as to measure terminal velocity in tube 14. These successive measurements are displayed at unit 30 and/or stored for later use to be described. Stopcocks 20,18 are then opened and closed in turn so as to pass the shell to the meniscus at the upper end of tube 14 from whence it may be removed by the specimen bottle 34 in a manner opposite to that previously described.

Figure 2:
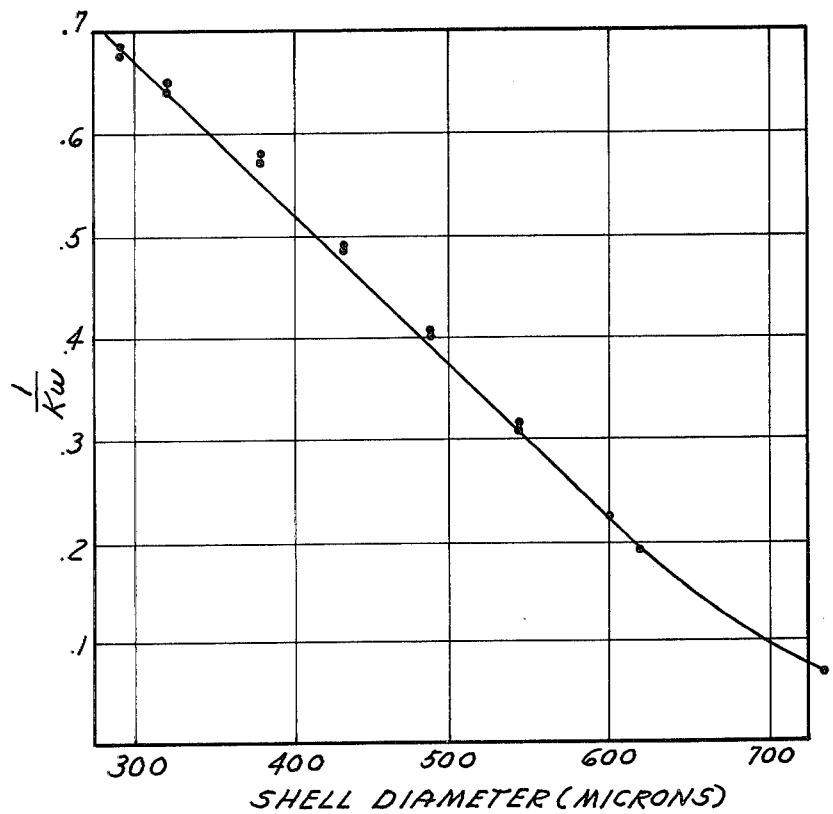
FIGS. 2 and 3 are graphs which demonstrate operation of the invention as embodied in FIG. 1.

FIG. 2 is a graph which demonstrates the invention in operation for measuring shell outside diameter. In the apparatus utilized in formulating FIG. 2, tube 12 (FIG. 1) had an inside diameter of 1910 microns and tube 14 an inside diameter of 890 microns. In FIG. 2, the abscissa is a measure of shell diameter in microns. The ordinate is the reciprocal of wall-effect factor $K_w$ where $$Kw = \frac{\text{Terminal Velocity in 12}}{\text{Terminal Velocity in 14}}$$

FIG. 2 was prepared empirically by measuring terminal velocities and determining wall effect factor Kw for shells of precalibrated diameter. As will be appreciated from inspection of FIG. 2, the plot of shell diameter versus 1/Kw describes a smooth, almost sraight curve over the range measured. Thus, once a curve of the type in FIG. 2 is prepared empirically for a given apparatus 10 and shells of a given material, unknown shell outside diameter may be determined by measuring terminal velocities, determining Kw and then locating the corresponding shell diameter using the curve. These operations may be performed by hand or, more preferably, by fully automated computation means having the curve of FIG. 2 stored therein. Shell diameter measurement accuracies of 0.5% have been achieved.

Figure 3:
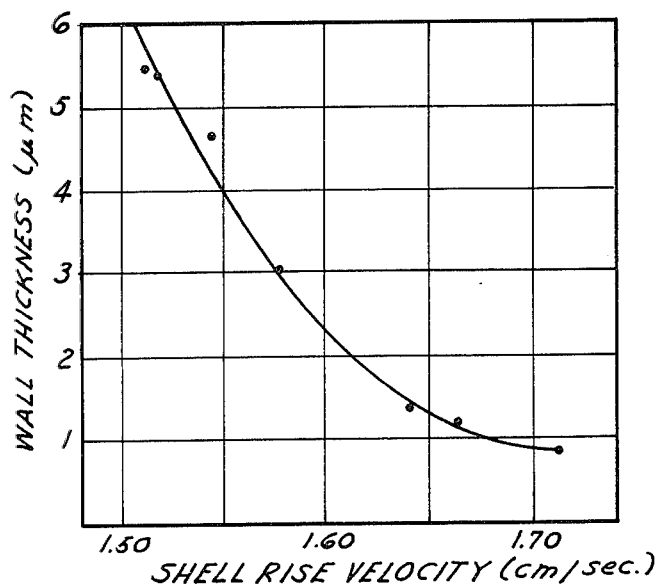

FIG. 3 is an empirically-derived curve relating shell wall thickness in microns to terminal velocity in tube 12 measured in cm/sec. for shells of diameter predetermined per the operation previously described, in this case 514±3 microns outside diameter. Again, it will be noted that the plot of wall thickness versus terminal velocity describes a smooth curve over the range tested. Hence, once a curve has been empirically derived for shells of predetermined size, or a family of curves for shells in different diameter ranges, wall thickness may be readily determined. It will be readily appreciated that both outside diameter and wall thickness may be determined following a single passage of a shell through apparatus by first determining shell diameter per FIG. 2 and then, having reference to the curve corresponding to FIG. 3 for shells of that diameter, determining wall thickness.

Figure 5:
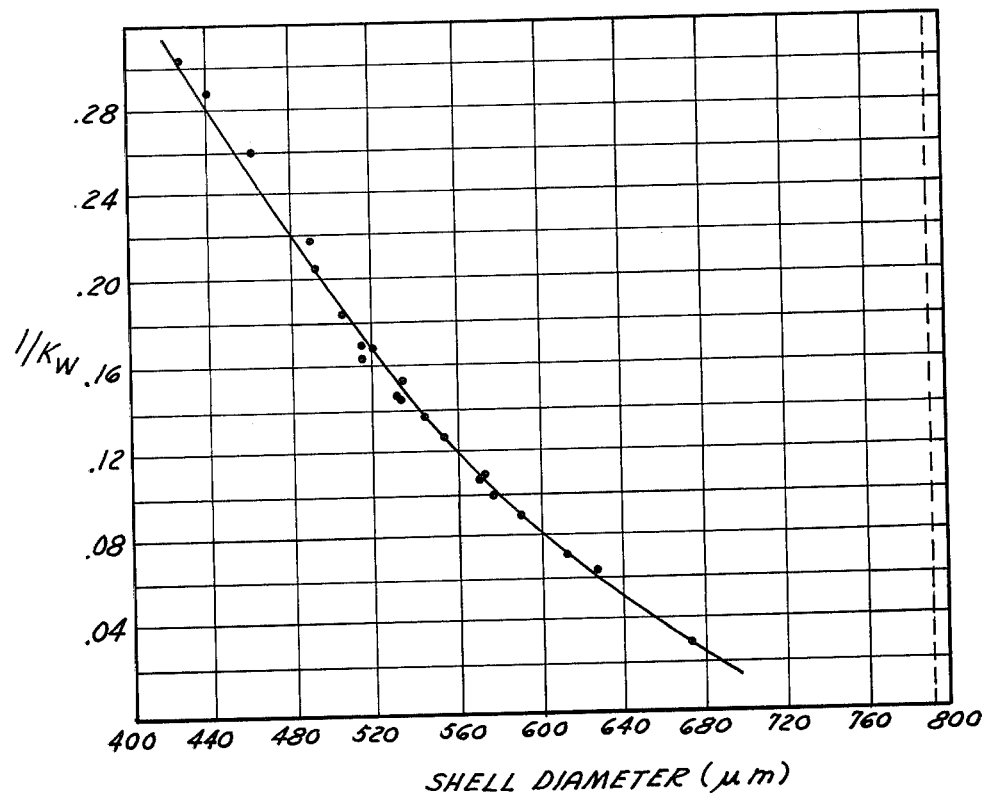
FIG. 5 is a graph demonstrating operation of the embodiment of FIG. 4.

FIG. 4 illustrates an alternative embodiment 50 of apparatus for practicing the invention comprising a lower tube 52 of narrow inside diameter coupled by a plug 58 to an upper tube 56 having an inside diameter as compared with the diameter of shells to be tested such that wall effects in tube 56 are negligible. Embodiment 50 is vertically supported by a clamp 60. In a specific embodiment per FIG. 4 for which results are plotted in FIG. 5, lower tube 54 had an inside diameter of 792±10 microns and upper tube 56 had an inside diameter of 2.0 cm. Again, a smooth curve relating shell outside diameter to the reciprocal of wall effect factor was demonstrated.

In conducting tests to demonstrate the invention, it was at first noted that individual shells did not show good repeatability on successive passes through the apparatus, but in fact demonstrated increasing terminal velocities on each pass. Microscopic examination of the shells before and after multiple passes revealed that irregularities on the shell outer surface tended to erode after multiple passes, after which the terminal velocity measurements exhibited good repeatability. It is therefore preferred to "surface clean" shells prior to inserting the same into tube 12 (FIG. 1) or 54 (FIG. 4). This may be accomplished by blending the shell-containing meniscus of bottle 34 to a separate tube (not shown) filled with water and then inverting the same with ends plugged so as to cause the shell to traverse the length of the tube several times. The shell may then be removed by inverting the specimen bottle, etc. per the previous discussion relation to FIG. 1. Other methods of cleaning, such as agitation of a batch of shells in water or other cleaning agent, may also be suitable.

In the various embodiments and tests herein described, distilled water at room temperature is utilized as a shell-traversing (and cleaning) fluid. Water was selected because the shells under test are buoyant therein, because the viscosity of water allows sufficiently low terminal velocity to enhance accuracy and repeatability without unduly prolonging each test run, and for other obvious reasons of economy, etc. Other fluids of greater or lesser viscosities (including air) may be used where appropriate without departing from the invention.

What is claimed is:

1. A method of measuring dimensional characteristics of minute elements comprising the steps of:
    (a) providing first and second fluid-filled paths having differing cross-sectional dimension,
    (b) directing each said element successively through said paths such that said elements travel at terminal velocity through at least a portion of each said path,
    (c) measuring said terminal velocities of each said element in each said path, and
    (d) determining a dimensional characteristic of each said element as a predetermined function of the ratio of said terminal velocities.

2. A method of measuring characteristics such as diameter and wall thickness of minute hollow spherical shells comprising the steps of:
    (a) providing first and second fluid-filled paths having differing inside diameters, at least one of said inside diameters being such as to affect the terminal velocity of shells traveling therethrough,
    (b) directing each of said shells successively through said fluid-filled paths such that said shells travel at terminal velocity through at least a portion of each of said paths, and then
    (c) determining said characteristic as a predetermined empirical function of a ratio of said terminal velocities.

3. The method set forth in claim 1 or 2 wherein said fluid is air.

4. A method of measuring dimensional characteristics of spherical shells comprising the steps of:
    (a) providing a continuous vertically oriented tubular path having at least first and second path portions with respectively differing substantially constant inside diameters,
    (b) filling said continuous path with a fluid in which said shells are buoyant,
    (c) directing said shells through said path by injecting each of said shells into a lower portion of said path and permitting each of said shells to ascend successively through said first and second path portions at first and second velocities, and
    (d) determining said characteristics as a function of said velocities.

5. The method set forth in claim 4 wherein said step (d) comprises the step of
    (d1) measuring said first and second velocities, and then
    (d2) determining said characteristics as a predetermined empirical function of the ratio of said velocities.

6. The method set forth in claim 2, 4 or 5 comprising the additional step of surface cleaning each of said shells prior to directing said shells through said fluid by directing fluid over the surface of said shells.

7. The method set forth in claim 1, 2 or 4 wherein said fluid is water.

8. The method set forth in claim 2 or 4 for measuring outside diameter and wall thickness of said shells wherein said step (d) comprises the steps of
   (d1) determining shell outside diameter as a first predetermined empirical function of the ratio of said velocities, and then
   (d2) determining shell wall thickness as a second predetermined empirical function of one of said velocities for shells of given outside diameter.

9. Apparatus for measuring characteristics such as diameter and wall thickness of minute hollow spherical shells comprising means providing a continuous longitudinal path having at least first and second path portions with respectively differing substantially constant diameters, a fluid disposed in said path, means for admitting shells into said path such that said shells travel at differing first and second velocities through said first and second path portions, and means for measuring said velocities wherefrom at least one of said characteristics may be determined as a predetermined function of the ratio of said velocities.

10. The apparatus set forth in claim 9 for measuring characteristics of shells having an outside diameter within a predetermined range and wherein the inside diameter of at least one of said path portions is such as to affect the velocity of said shells through said path portion.

11. The apparatus set forth in claim 9 or 10 wherein said fluid has a density greater than that of said shells such that said shells are buoyant in said fluid and wherein said apparatus further comprises means for vertically orienting said path.

12. The apparatus set forth in claim 11 wherein said fluid is water.

* * * * *